U S009557344B2

United States Patent
Tam et al.

(10) Patent No.: US 9,557,344 B2
(45) Date of Patent: Jan. 31, 2017

(54) SENSOR FOR MEASURING FLOW SPEED OF A FLUID

(75) Inventors: Hwayaw Tam, Hong Kong (HK); Aping Zhang, Hong Kong (HK); Shaorui Gao, Hong Kong (HK); Lok Hin Cho, Hong Kong (HK)

(73) Assignee: The Hong Kong Polytechnic University, Hong Kong (HK)

( * ) Notice: Subject to any disclaimer, the term of this patent is extended or adjusted under 35 U.S.C. 154(b) by 830 days.

(21) Appl. No.: 13/181,502

(22) Filed: Jul. 12, 2011

(65) Prior Publication Data

US 2013/0014577 A1 Jan. 17, 2013

(51) Int. Cl.
*G02B 6/00* (2006.01)
*G01P 5/10* (2006.01)
*G01F 1/688* (2006.01)
*G02B 6/02* (2006.01)
*G02B 6/12* (2006.01)

(52) U.S. Cl.
CPC ............... *G01P 5/10* (2013.01); *G01F 1/6884* (2013.01); *G02B 6/02204* (2013.01); *G02B 2006/12107* (2013.01); *G02B 2006/12138* (2013.01)

(58) Field of Classification Search
CPC ........................................................ G01P 5/10
USPC ........................................................... 385/12
See application file for complete search history.

(56) References Cited

U.S. PATENT DOCUMENTS

| 673,075 | A | 4/1901 | Douane |
|---|---|---|---|
| 3,251,228 | A | 5/1966 | Hanebuth |
| 3,580,081 | A | 5/1971 | Greenberg et al. |
| 3,620,207 | A | 11/1971 | Sinclair et al. |
| 3,789,831 | A | 2/1974 | Kopaniky et al. |
| 3,797,310 | A | 3/1974 | Babcock et al. |
| 3,917,945 | A | 11/1975 | Sema et al. |
| 3,960,017 | A | 6/1976 | Romanowski et al. |
| 4,016,761 | A | 4/1977 | Rozzell et al. |
| 4,075,493 | A | 2/1978 | Wickersheim et al. |
| 4,111,050 | A | 9/1978 | Waddoups et al. |
| 4,136,566 | A | 1/1979 | Christensen et al. |
| 4,140,393 | A | 2/1979 | Cetas et al. |
| 4,179,927 | A | 12/1979 | Saaski et al. |
| 4,204,119 | A | 5/1980 | Yasuno et al. |
| 4,215,275 | A | 7/1980 | Wickersheim et al. |
| 4,223,226 | A | 9/1980 | Quick et al. |
| 4,245,507 | A | 1/1981 | Samulski et al. |
| 4,295,739 | A | 10/1981 | Meltz et al. |
| 4,313,344 | A | 2/1982 | Brogardh et al. |

(Continued)

OTHER PUBLICATIONS

Bennion et al., "Fiber Bragg Grating Technologies and Applications in Sensors", OSA.OFC, 2006, pp. 2415-2417.

(Continued)

*Primary Examiner* — Mike Stahl
*Assistant Examiner* — Kajli Prince
(74) *Attorney, Agent, or Firm* — KPPB LLP

(57) ABSTRACT

A sensor for measuring flow speed of a fluid, comprising: a light-absorbing optical fiber having a fiber Bragg grating inscribed in the fiber; wherein light is emitted into the light-absorbing optical fiber to heat the optical fiber and the fiber Bragg grating, and when the fluid passes over the sensor, the flow speed of the fluid is determined by the rate of heat loss from the sensor, and the temperature of the sensor is determined from the wavelength shift of the central wavelength of the fiber Bragg grating.

24 Claims, 13 Drawing Sheets

(56) References Cited

U.S. PATENT DOCUMENTS

| | | | |
|---|---|---|---|
| 4,320,650 | A | 3/1982 | Kita et al. |
| 4,344,315 | A | 8/1982 | Moxon et al. |
| 4,344,322 | A | 8/1982 | Plapp et al. |
| 4,354,504 | A | 10/1982 | Bro et al. |
| 4,621,929 | A | 11/1986 | Phillips |
| 4,677,985 | A | 7/1987 | Bro et al. |
| 5,174,299 | A | 12/1992 | Nelson et al. |
| 5,207,227 | A | 5/1993 | Powers |
| 5,373,850 | A | 12/1994 | Kohno et al. |
| 5,509,424 | A | 4/1996 | Al-Ali |
| 5,582,628 | A | 12/1996 | Wood |
| 5,617,870 | A | 4/1997 | Hastings et al. |
| 5,865,871 | A | 2/1999 | Simundich et al. |
| 6,431,010 | B1 | 8/2002 | Joffe |
| 2006/0028650 | A1* | 2/2006 | Crickmore et al. ........... 356/479 |
| 2006/0117844 | A1* | 6/2006 | Birkle et al. ................ 73/204.23 |
| 2007/0230881 | A1* | 10/2007 | Tammela et al. ............. 385/115 |
| 2008/0095612 | A1* | 4/2008 | Girbig et al. ................. 415/118 |

OTHER PUBLICATIONS

Bruun, "Hotwire Anemometry: Principles and Signal Analysis", Oxford University Press, 1995, 3 pgs.

Buric et al., "Active Fiber Bragg Grating Hydrogen Sensors for All-Temperature Operation", IEEE Photonics Technology Letters, Mar. 1, 2007, vol. 19, No. 5, pp. 255-257.

Byrne et al., "A Bragg grating based on fibre optic reference beam laser Doppler anemometer", Meas. Sci. Technol, 2001, vol. 13, pp. 909-913.

Chen et al., "Controlling Fiber Bragg Grating Spectra With In-Fiber Diode Laser Light", IEEE Photonics Technology Letters, Aug. 2004, vol. 16, No. 8, pp. 1897-1899.

Chen et al., "Self-heated fiber Bragg grating sensors", Applied Physics Letter, 2005, vol. 86, pp. 143502-1-143502-3.

Chen et al., "Simultaneous Strain and Temperature Measurements with Fiber Bragg Grating Written in Novel Hi-Bi Optical Fiber", IEEE Photonics Technology Letters, Jan. 2004, Nol. 16, No. 1, pp. 221-223.

Ding et al., "Fiber-Taper Seeded Long-Period Grating Pair as a Highly Sensitive Refractive-Index Sensor", IEEE Photonics Technology Letters, Jun. 2005, vol. 17, No. 6, pp. 1247-1249.

Frazao et al., "Optical flowmeter using a modal interferometer based on a single nonadibatic fiber taper", Optics Letters, Jul. 15, 2007, vol. 32, No. 14, pp. 1974-1976.

Guan et al., "Simultaneous strain and temperature measurement using a single fibre Bragg grating", Electronics Letters, Jun. 8, 2000, vol. 36, No. 12, pp. 1018-1019.

Jewart et al., "X-probe flow sensor using self-powered active fiber Bragg gratings", Sensors and Actuators, 2006, vol. A 127, pp. 63-68.

Kersey et al., "Fiber Grating Sensors", Journal of Lightwave Technology, Aug. 1997, vol. 15, No. 8, pp. 1442-1463.

Lamb et al., "A comparative assessment of two optical fibre techniques for measuring the speed of the electric wind in a negative polarity, atmospheric corona discharge", Measurement Science and Technology, 2006, vol. 17, pp. 1343-1349.

Lamb et al., "Laser-optical fiber Bragg grating anemometer for measuring gas flows: application to measuring the electric wind", Optics Letter; Apr. 15, 2006, vol. 31, No. 8, pp. 1035-1037.

Lee, "Review of the present status of optical fiber sensors", Optical Fiber Technology, 2003, vol. 9, pp. 57-79.

McMillen et al., "Fiber Bragg grating vacuum sensors", Applied Physics Letters, 2005, vol. 87, pp. 234101-1-234101-3.

Slavik et al., "Active control of long-period fiber-grating-based filters made in erbium-doped optical fibers", Optics Letters, Apr. 1, 2007, vol. 32, No. 7, pp. 757-759.

Stieglmeier et al., "Mobile fiber-optic laser Doppler anemometer", Applied Optics, Jul. 20, 1992, vol. 31, No. 21., pp. 4096-4105.

Takagi, "A hot-wire anemometer compensated for ambient temperature variations", J. Phys. E: Sci. Instrum, 1986, vol. 19, pp. 739-743.

Takashima et al., "A water flowmeter using dual fiber Bragg grating sensors and cross-correlation technique", Sensors and Actuators, 2004, vol. A 116, pp. 66-74.

Zhang et al., "Sandwiched Long-Period Gratings for Simultaneous Measurement of Refractive Index and Temperature", IEEE Photonics Technology Letters, Nov. 2005, vol. 17, No. 11, pp. 2397-2399,.

* cited by examiner

SENSOR FOR MEASURING FLOW SPEED OF A FLUID

TECHNICAL FIELD

The invention concerns a sensor and method for measuring flow speed of a fluid using a laser-heated fiber Bragg grating (LHFBG). Also, the invention concerns an optical fiber miniature heater.

BACKGROUND OF THE INVENTION

Optical fiber gratings are an important enabling technology for the realization of many optical sensors for a wide variety of measurements. Due to their many advantages including compactness, high sensitivity, fast response, electromagnetic immunity and multiplexing capability, a variety of sensors such as strain and temperature sensors, refractive index sensors, have been developed by using fiber Bragg gratings (FBGs) or long-period gratings (LPGs). In recent years, researchers have attempted to develop fiber grating sensors to measure different parameters for various industrial applications. This permits the use of a single interrogator to deal with many FBGs to measure various kinds of parameters that could eventually increase the cost effectiveness of FBG sensor systems.

One kind of FBG-based sensor being developed is an optical fiber anemometer or flowmeter for the measurement of gas or liquid flow speed. An FBG-based anemometer has widespread applications, for example in wind turbines where FBG sensors are being actively investigated to measure temperature, strain and vibration of wind turbine blades. Although many kinds of anemometers and flowmeters have been developed using different principles including laser, Doppler technology, cross-correlation technique or fiber modal interferometer, and hot-wire anemometry.

Hot-Wire Anemometry (HWA) is based on the heat transfer from sensors to the surrounding environment. In order to achieve a localized hot fiber section, light-absorption or active fibers can be used for making spectrum controllable FBGs or LPGs. Compared with passive fiber grating sensors, fiber grating sensors heated with laser power have some enhanced features like controllable sensitivity, responsivity, and dynamic range to enable measurement in large temperature range. An FBG anemometer externally heated by using a $CO_2$ laser for measuring gas flow in the high-voltage environment (corona discharge) may be too bulky for some industrial applications. To address this, a flowmeter based on two cross-mounted thin-silver coated FBGs internally heated by laser light for measuring the magnitude and direction of gas flow may be used.

Measurement of wind speed may be performed by localized heating with a $CO_2$ laser beam and use a fiber Bragg grating (FBG) written in an optical fiber to measure convection cooling. The main disadvantages of this approach are: precision alignment of the laser beam to heat the FBG is not practical in many applications, difficulty in ensuring exact amount of light energy absorbed by the FBG; using the temperature-dependent spectrum of FBG to provide light intensity to temperature relationship which is not as reliable, and difficulty in multiplexing several sensors together.

An optical fiber has been used to deliver light energy to heat a temperature-sensitive material attached to the tip of the fiber. However, this system is complicated and difficult to implement. It uses an optical fiber to deliver light to heat an element attached to the tip of the fiber making multiplexing difficult.

A light absorption material (such as epoxy) has been used which is placed at the tip of an optical fiber and heated by a laser beam via the optical fiber. A thermocouple element inserted in the material was used to measure the temperature. It is basically an electrical point sensor and therefore experiences the same disadvantages as any electrical sensor such as being prone to Electromagnetic Interference (EMI) and difficulty in multiplexing.

A fiber Bragg grating (FBG) has been used as a temperature sensor which uses a laser beam delivered via the fiber to heat a thin metallic coating deposited onto the surface of the fiber surrounding the FBG. The main disadvantages are that it is an extrinsic sensor in which metallic coating needs to be deposited onto the fiber surface. It also suffers from inefficient heating and the thin-film heater cook quickly by fluid and therefore may not be suitable for fluid flow measurement.

SUMMARY OF THE INVENTION

In a first preferred aspect, there is provided a sensor for measuring flow speed of a fluid. The sensor comprises a light-absorbing optical fiber having a fiber Bragg grating inscribed in the fiber. Light is emitted into the light-absorbing optical fiber to heat the optical fiber and the fiber Bragg grating. When the fluid passes over the sensor, the flow speed of the fluid is determined by the rate of heat loss from the sensor, and the temperature of the sensor is measured from the wavelength shift of the central wavelength of the fiber Bragg grating.

The light may be emitted into a core, cladding or inner cladding of the light-absorbing optical fiber.

The optical fiber may be photosensitive and is co-doped with light absorption materials including any one from the group consisting of: Vanadium, Cobalt, Ytterbium and Neodymium.

The central wavelengths may be recorded by a fiber Bragg grating interrogator.

Pump power of the light may be increased to improve the sensitivity of the sensor if the flow speed of the fluid is high.

The fiber Bragg grating may be housed within a tube, and convection slots are defined in the tube to allow the fiber Bragg grating to be exposed to ambient air.

The sensor may be recoated with a polymer to increase the sensitivity of the sensor at higher flow rate. The length of the sensor is several millimeters/centimeters long of the light-absorbing fiber with FBG inscribed in it. The sensor is fusion joined to a low-loss optical fiber (for example, standard telecommunication single-mode optical fiber). Therefore both the laser light to heat the sensor and interrogation light used to interrogate the FBG to determine its temperature can be delivered to the sensor over 1 meter to many kilometers of the low-loss optical fibers.

The optical fiber may be surrounded by a heat insulating material to slow the rate of heat loss for extending the range of measurement of the fluid.

The heat insulating material may be glass or polymers.

The fiber Bragg grating may be sealed in an alundum tube to reduce heat transfer.

The relationship between the heat loss, $H_{loss}$, and the flow speed of the fluid v may be calculated by: $H_{loss}=[T_a(v)-T_e](A+B\sqrt{v})$, where $T_a$ is the temperature of the sensor, $T_e$ is the temperature of the ambient environment, are A and B are empirical calibration constant.

Dependence of a wavelength shift Δλ of the sensor on the flow speed of the fluid v may be calculated by:

$$\lambda(v) - \lambda_{e0} = \lambda_{h0}(\alpha + \xi) H_{loss}/(A + B\sqrt{v}),$$

where $\Delta T_0 = T_a(0) - T_e$, $\lambda_{e0}$ is a wavelength of the fiber Bragg grating before heating, $\lambda_{h0}$ is a wavelength of the heated fiber Bragg grating before the fluid passes over the sensor, α is a thermal expansion coefficient, and ξ is a thermo-optic coefficient.

The optical fiber may have a light absorption coefficient between about 1 dB/cm to about 150 dB/cm.

The light may have a pump power of more than 1 mW.

The light-absorbing optical fiber may be a double-clad (DC) fiber, and the core of the optical fiber is surrounded by inner cladding, or inner cladding and outer cladding. The light-absorbing optical fiber can be fabricated using a stack-and-draw technique of photonic crystal fibers.

The optical fiber may have a light absorption coefficient that is a predetermined amount such that light-to-heat conversion occurs within a short section of the optical fiber.

The optical fiber may have a long-period grating (LPG), to couple pump light from the core to the light absorption materials.

In a second aspect, there is provided a system for measuring flow speed of a fluid, comprising a plurality of sensors as described that are multiplexed together.

Multiple sensors consisting of short sections of the light-absorbing optical fibers with FBGs inscribed in each of them are connected in a single line by fusion joining the sensors with sections of low-loss optical fibers so that sufficient light from both the pump laser and interrogating light can reach the last sensor located furtherest down the optical fiber line.

The system may further comprise an optical splitter to deliver the light to each sensor along a plurality of different optical fibers.

In a third aspect, there is provided a method for measuring flow speed of a fluid. The method comprises emitting a light to heat a light-absorbing optical fiber and a fiber Bragg grating inscribed in the light-absorbing optical fiber to measure temperature. The method also comprises monitoring the wavelength shift of the central wavelength of the fiber Bragg grating when the fluid passes over the optical fiber. The method also comprises measuring the temperature of the fiber Bragg grating to determine the rate of heat loss using the monitored wavelength shift, in order to measure the flow speed of the fluid.

Pump power of the light may be increased when the flow speed of the fluid is high.

In a fourth aspect, there is provided an optical fiber heater. The heater comprises a light-absorbing optical fiber having a fiber Bragg grating inscribed in the fiber. Light with a predetermined amount of pump power is emitted into the light-absorbing optical fiber to heat the optical fiber and the fiber Bragg grating in order to raise the temperature of the light-absorbing optical fiber to a predetermined temperature of up to at least 600° C., and the predetermined temperature is monitored by measuring the wavelength shift of the central wavelength of the fiber Bragg grating.

The optical fiber heater may be introduced into a living organism and the predetermined amount of pump power is selected to generate a localised predetermined temperature to kill cancer cells proximal to the light-absorbing optical fiber causing heat-induced cancer cell death.

The present invention is an optical fiber heater or temperature sensor using various designs of light-absorption optical fibers with fiber Bragg grating and also concerns pumping schemes to provide fiber-optic anemometers for the measurement of flow speed of a liquid and heater for possible use in heat-induced cancerous cell death. The flow speed of the liquid is calculated based on the heat transfer from the sensor to the ambient environment. It is highly reliable to measure the FBG wavelength for measuring temperature. A heat source and a temperature sensor are part of the optical fiber. The light absorption fiber is efficiently heated with a laser or any light-emitting diodes that are able to couple optical power into an optical fiber and is inscribed with temperature-sensitive fiber gratings for fluid flow speed measurements.

Advantageously, the present invention enables measuring fluid flow rate at where the fluid is at a high temperature beyond 40° C. Also, long distance measurement is enabled where the FBG interrogator can be located at least 10 kilometers from the sensor. The present invention provides an intrinsic sensor where the fiber itself is the sensor because it is the heating element as well as temperature sensor. The present invention can withstand high ambient temperatures greater than 400° C. The present invention is mass-producible and therefore potentially low-cost, which also permits a large number of sensors connected in series along a single optical fiber or connected in parallel along several optical fibers using an optical splitter. These series of sensors along a single fiber or multiple fibers enable distributed flow rate measurement.

BRIEF DESCRIPTION OF THE DRAWINGS

An example of the invention will now be described with reference to the accompanying drawings, in which.

DETAILED DESCRIPTION OF THE DRAWINGS

Figure 1:
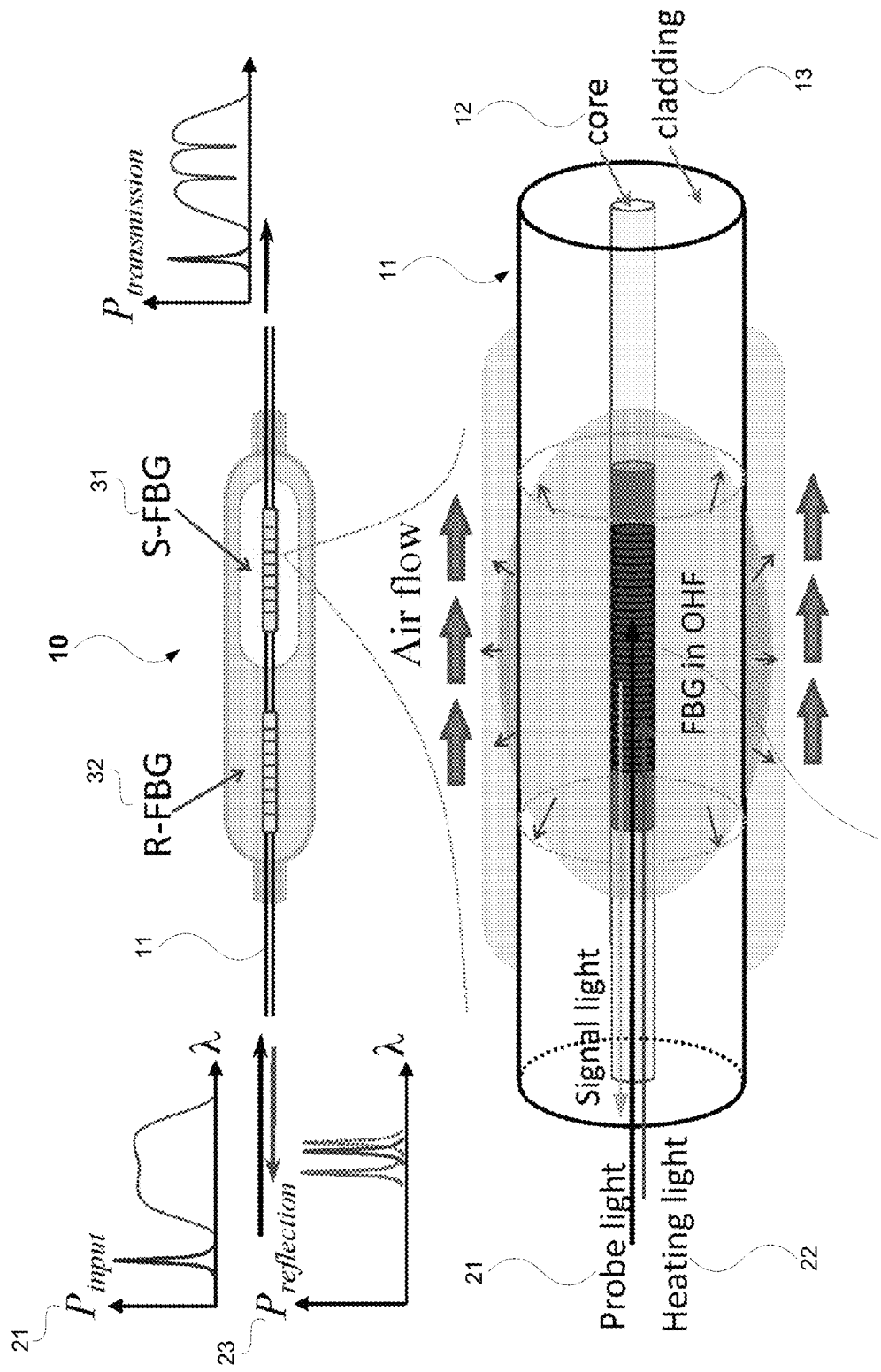
FIG. 1 is a schematic diagram and working principle of a laser-heated fiber Bragg grating (LHFBG) anemometer in accordance with an embodiment of the present invention.

Referring to FIG. 1, an FBG-based anemometer 10 is provided. An FBG 30 is inscribed in an optical fiber 11. The fiber 11 is photosensitive to enable the FBG 30 to be inscribed for measuring temperature. The fiber 11 is made of fused silica which has a very high melting point and may be used in a very high temperature environment beyond 400° C. A light beam 20 is emitted into the fiber 11 to directly heat the FBG 30 to temperatures greater than 200° C. As a fluid such as air or a liquid passes over the anemometer 10, the rate of heat loss of the FBG 30 is measured from the wavelength shift of its central wavelength. The fiber 11 is co-doped with light absorption materials such as Vanadium, Cobalt, Ytterbium or Neodymium. These light absorption materials are highly efficient at converting light into heat.

Figure 9:
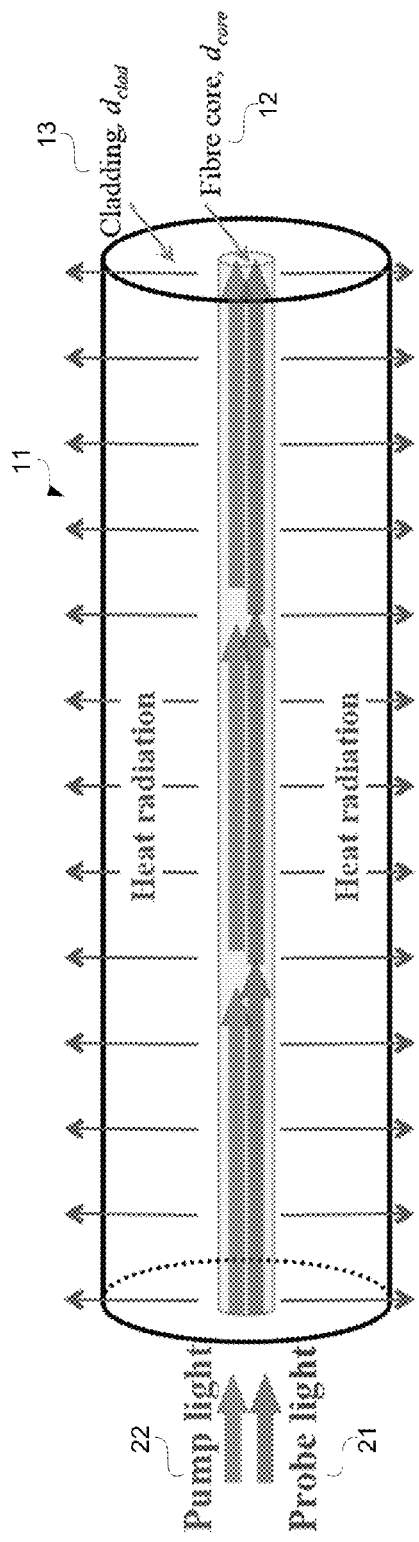
FIG. 9 is a schematic diagram of a laser-heated fiber Bragg grating (LHFBG) anemometer using a first type of optical fiber in accordance with an embodiment of the present invention.
Figure 10:
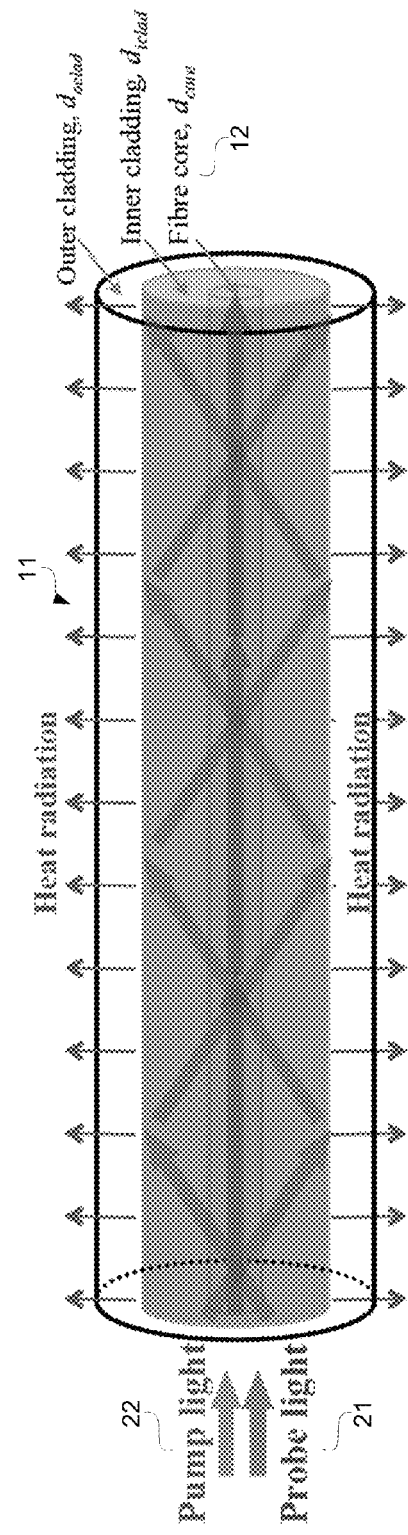
FIG. 10 is a schematic diagram of a laser-heated fiber Bragg grating (LHFBG) anemometer using a second type of optical fiber in accordance with an embodiment of the present invention.

Referring to FIGS. 9 and 10, fiber A and fiber B are made of glass, and doped with light-absorption material(s) such as Vanadium, Cobalt, Ytterbium or Neodymium in selected regions. The selected regions are: only the core 12; only the inner cladding; only the outer cladding; the core 12 and inner cladding; the inner and outer cladding; and core 12 and the inner and outer cladding. The light-absorption material(s) provide high light-to-heat conversion within about 10-mm of the fibers. Temperature-sensitive fiber Bragg gratings 30 are inscribed in the core 12 of the fiber. The pump light 22 to heat the light-absorption material(s) and the probe light 21 for reading the temperature from the fiber Bragg gratings 30 have the same or different optical spectra. The probe light 21 propagates in the core 12 of the fiber but the pump light 22 can either propagate only in the core 12 (as depicted in Fiber A), only in the cladding(s) or both the core 12 and cladding(s) (as depicted in Fiber B).

Figure 11:
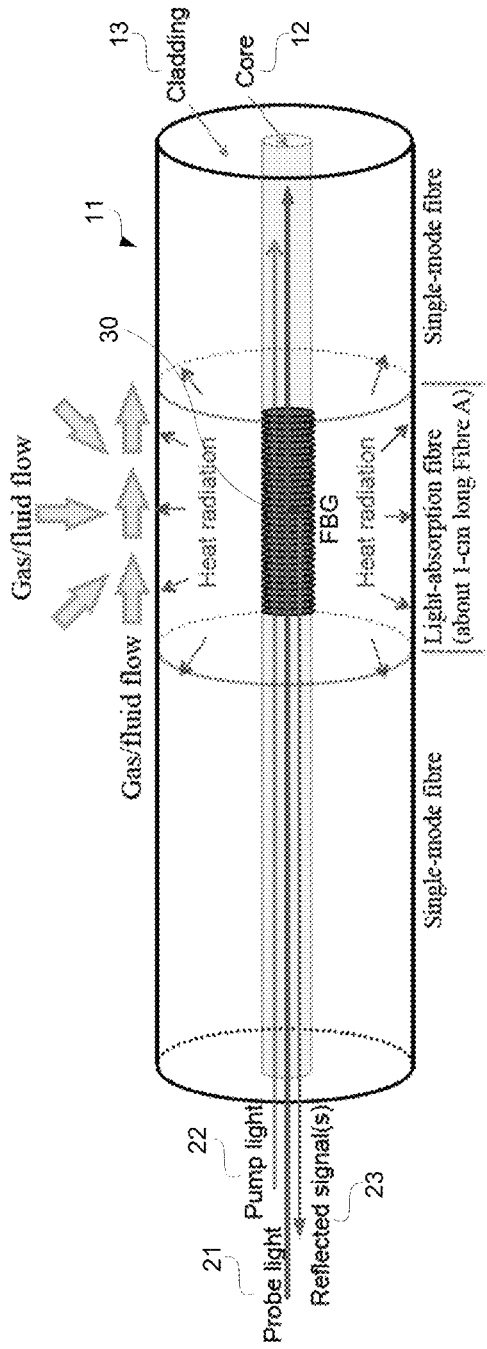
FIG. 11 is a schematic diagram of a first type of laser-heated fiber Bragg grating (LHFBG) anemometer in accordance with an embodiment of the present invention.

Referring to FIG. 11, a short length of Fiber A with an FBG 30 inscribed in it is spliced to Single Mode Fibers (SMFs) to construct an anemometer 10. The SMF(s) deliver the pump light 22 (to heat the core 12 of Fiber A) and probe light 21 (to measure the temperature via the FBG) to Fiber A. This enables measurement of the rate of heat transfer which corresponds to the speed of fluid flow along or at an angle to the anemometer 10. The fundamental mode of the light-absorption fiber 11 should match well with the fundamental mode of a conventional SMF. The absorption coefficient of the light-absorption fiber 11 should be sufficiently large for efficient light-to-heat conversion within ~10 mm of the fiber 11. For example, the absorption coefficient of the light-absorption fiber 11 may be from about 1 dB/cm to about 150 dB/cm. A plurality of these anemometers 10 can be connected in series along a single strand of optical fiber for multiple points sensing.

Figure 12:
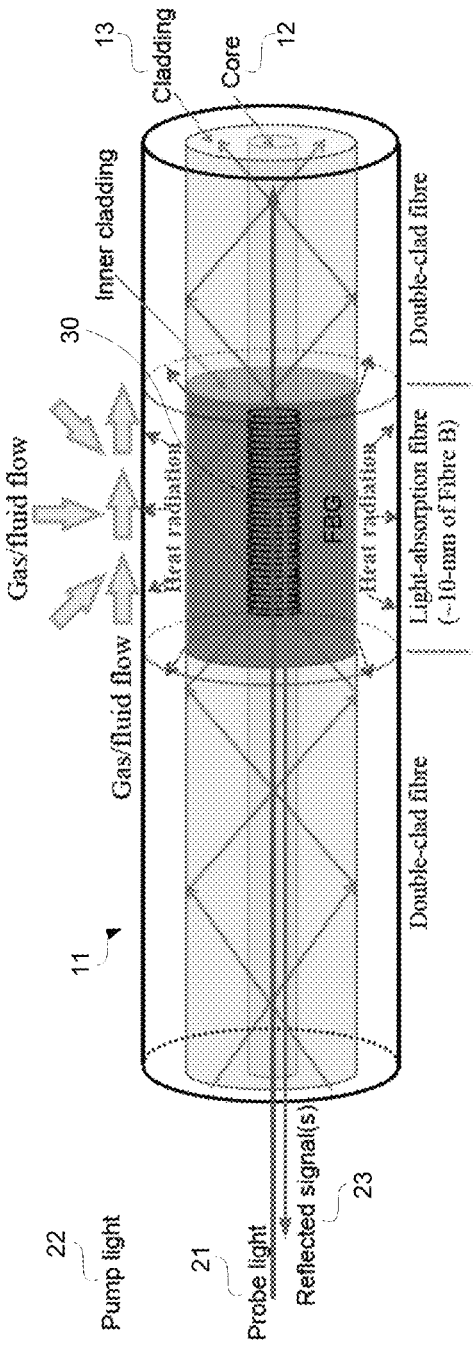
FIG. 12 is a schematic diagram of a second type of laser-heated fiber Bragg grating (LHFBG) anemometer in accordance with an embodiment of the present invention.

Referring to FIG. 12, a short length of Fiber B with an FBG 30 inscribed in it is spliced to double-clad (DC) fiber(s) to construct an anemometer 10. The DC fiber(s) deliver the pump light 22 (to heat Fiber B via the core and inner cladding of the DC fiber) and the probe light 21 (measure the temperature of Fiber B via the FBG). This enables measurement of the rate of heat transfer which depend on the speed of fluid flow along or at an angle to the anemometer. The fundamental mode of the light-absorption fiber 11 should match well with the fundamental mode of DC fiber. The DC fiber should efficiently couple the pump light 22 to the core 12 and inner cladding of Fiber B. A plurality of these anemometers 10 can be connected in series along a single strand of optical fiber for multiple points sensing.

Figure 13:
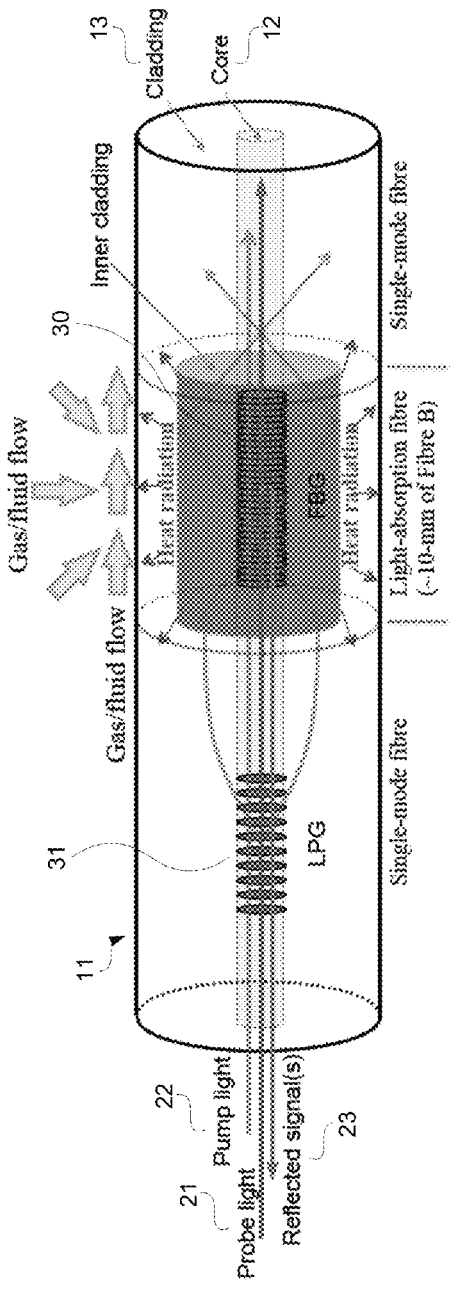
FIG. 13 is a schematic diagram of a third type of laser-heated fiber Bragg grating (LHFBG) anemometer in accordance with an embodiment of the present invention.

Referring to FIG. 13, the fundamental mode of the double-cladding fiber 11 should match well with the fundamental mode of conventional. SMF. The absorption coefficient of higher modes in the double-cladding fiber should be large for efficient light-to-heat conversion within ~10 mm. The thermal sensitivity of the LPG 31 should be very low (a special fiber should be used to make the LPG 31), and it will be better if the LPG 31 is with a flat-bottom transmission spectrum so that the pump light 22 can be effectively couple from the core to the light absorption materials. A plurality of these anemometers 10 can be connected in series along a single strand of optical fiber.

Figure 14:
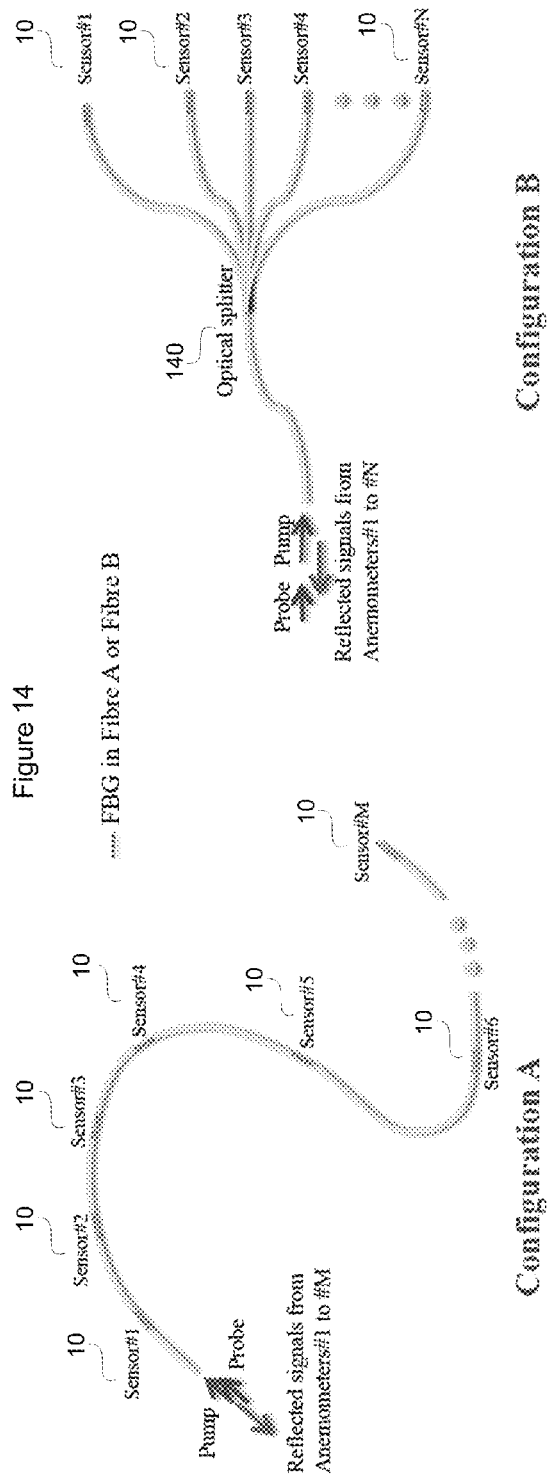
FIG. 14 is a schematic diagram of system of anemometer in accordance with an embodiment of the present invention.

Referring to FIG. 14, multiple FBG-based anemometers 10 are multiplexed together as shown in Configuration A, Configuration B or a combination of the two. Each sensing point is a short length of Fiber A or Fiber B with FBG inscribed 30 in them. The pump light 22 and the probe light 21 can be delivered to each sensing point via a single fiber or an optical splitter 140 to N number of ports. Reflected signals 23 from all the sensing points are directed back to the input fiber. This allows measurements of all the sensors 10 at the same time.

Figure 15:
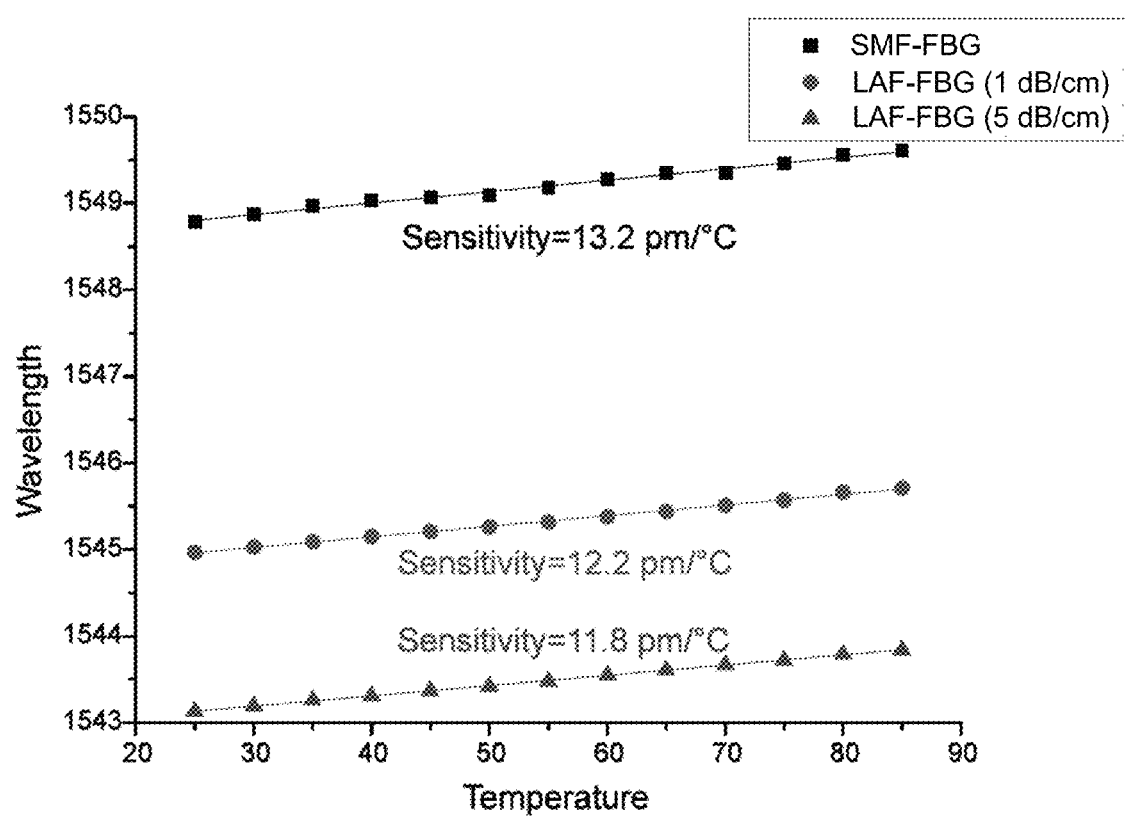
FIG. 15 is a chart depicting wavelength-shift versus temperature for SMF and two light-absorbing fibers (LAF) with different light absorption coefficients.

FIG. 15 is a chart depicting wavelength-shift versus temperature for three fibers depicted in FIGS. 11 to 13. The three fibers are single-mode fiber (SMF), hole-assisted fiber (HAF) with light absorption coefficient of 1 dB/cm and HAF with light absorption coefficient of 5 dB/cm. The comparison shows that sensitivity is greatest with SMF.

Figure 16:
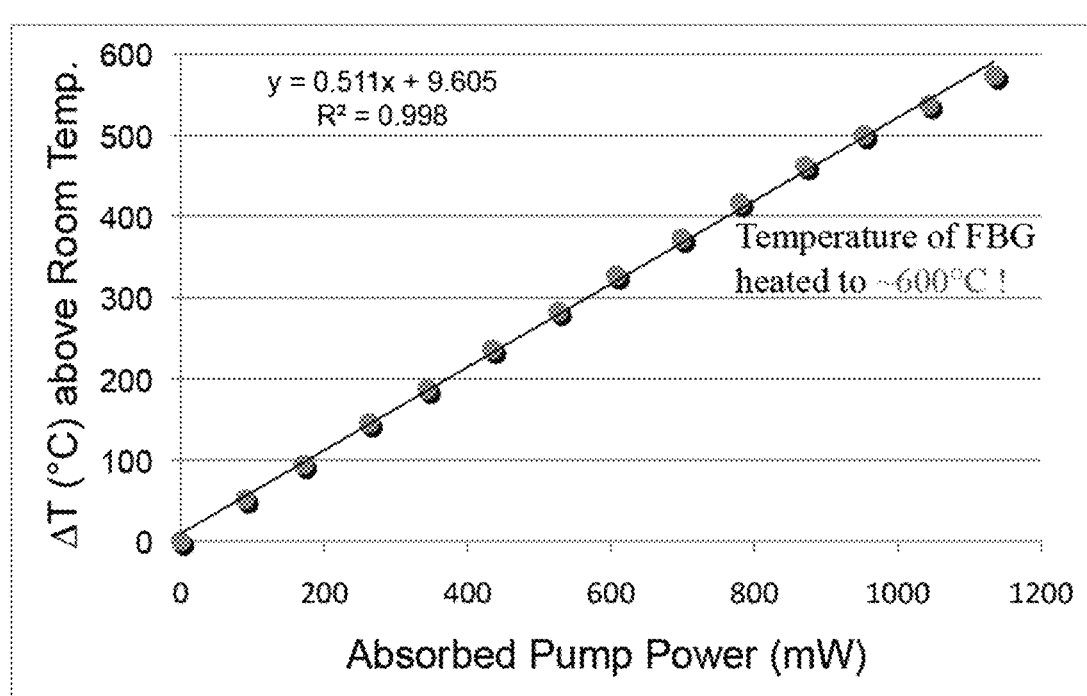
FIG. 16 is a chart depicting temperature of the FBG versus the absorbed pump power of a fiber with single cladding that is co-doped with Cobalt with an absorption coefficient of 5 dB/cm and a core with a 7-μm diameter.

FIG. 16 is a chart depicting Fiber A with Cobalt doped in a 7-μm diameter core (the concentration of Cobalt is 5 dB/cm). The temperature of the light-absorption fiber 11 when it is pumped with 1455 nm light is depicted. The chart illustrates that the temperature of the FBG is able to heated to approximately 600° C. when about 1100 mW of pump power is absorbed.

For comparative purposes between various embodiments of the present invention, a reference FBG (referred to as R-FBG 32) and a sensing FBG (referred to as S-FBG 32) are described. The R-FBG 32 is a reference element, and the S-FBG 31 is a sensing element. The R-FBG 32 and S-FBG 31 are written in a light absorption fiber 11. The pump laser 20 provides the heating light 22 into the fiber core 12 which is surrounded by the cladding 13. The temperature of the FBGs 31, 32 rises through nonradiative absorption. Broadband light at a different wavelength band is used as the probe light 21. The probe light 21 is used to monitor the Bragg wavelength of the laser-heated FBGs (LHFBGs) 31, 32. The air flow induced heat transfer is measured by monitoring the Bragg wavelengths of the S-FBG 31. The R-FBG 32 is packaged with a heat-insulation tube for monitoring the laser power variation. Experimental results show that the FBG-based anemometer 10 performs very well in measuring wind speed.

Fiber Bragg gratings 31, 32 are inscribed in two light absorption fibers 11 with different absorption coefficients are used in the wind speed measurement experiment. The S-FBG 31 is inscribed in the fiber 11 with a higher light absorption coefficient and thus could be heated to a higher temperature to achieve a large dynamic range of measurement. The absorption coefficient of the fiber 11 used for the fabrication of the S-FBG 31 is 5 dB/cm at the 1480 nm pump wavelength. The other fiber has an absorption coefficient of 1 dB/cm at 1480 nm and is used for the fabrication of the R-FBG 32. All FBGs 31, 32 are fabricated with a 193-nm ArF excimer laser (Coherent, Bragg Star S-Industrial) using the phase mask technique. The period of the phase mask is 1070 nm.

Figure 2:
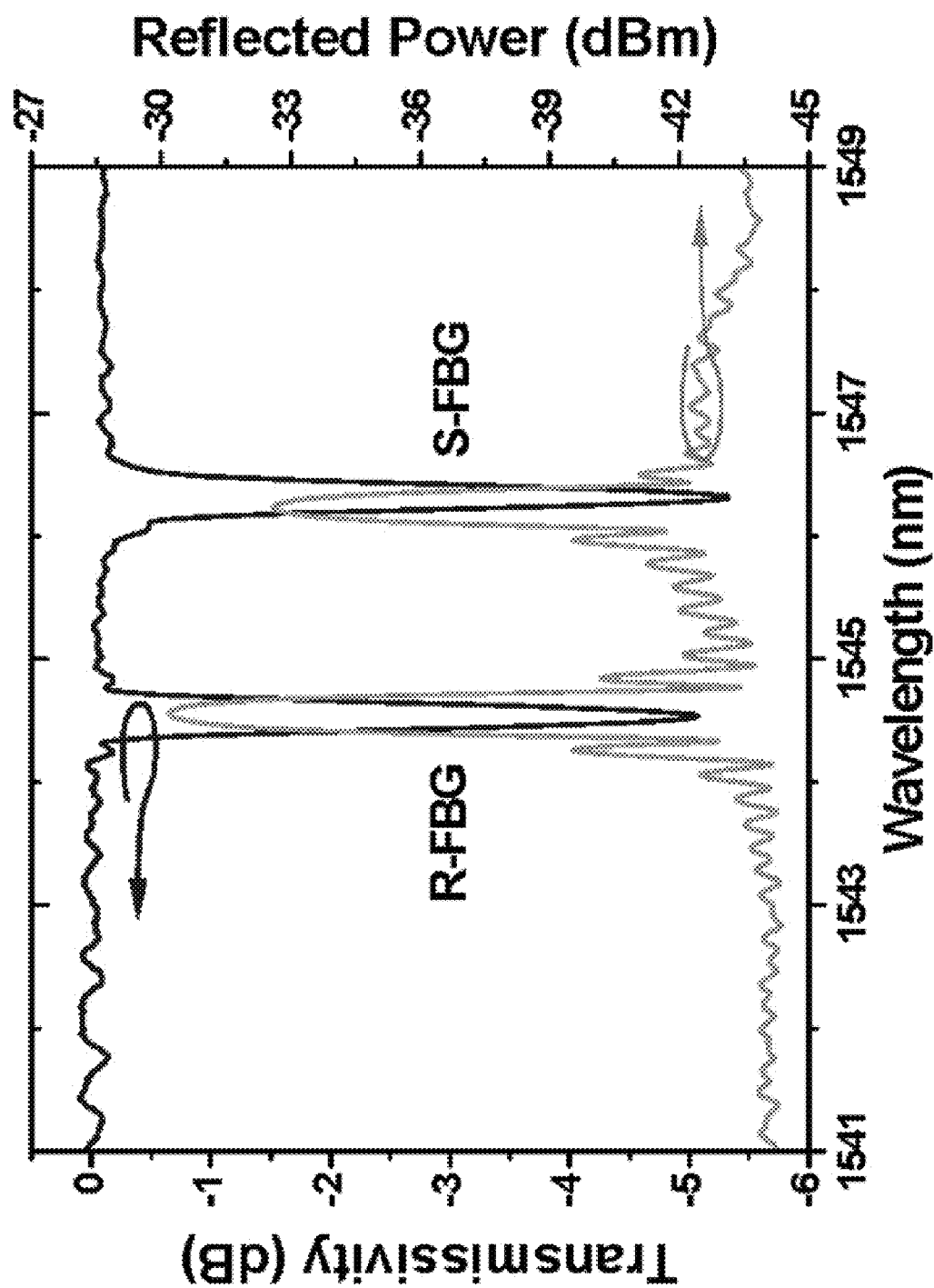
FIG. 2 is chart depicting transmission and reflection spectra of the R-FBG and S-FBG of FIG. 1.

Referring to FIG. 2, the measured transmission and reflection spectra of the S-FBG 31 and R-FBG 32 and the temperature dependency of their central wavelengths is depicted. The length of the two gratings is ~5 mm and written in a 7-mm long section of the light absorption fibers 11. The central wavelength and the transmission dip of the S-FBG 31 are 1546.31 nm and −5.33 dB, respectively, while the central wavelength and the transmission dip of the R-FBG 32 are 1544.54 nm and −5.07 dB, respectively. Both the probe light 21 and pump light 22 are launched from the R-FBG side of the fiber 11 and therefore reflected light 23 from the R-FBG 32 is slightly stronger than that from the S-FBG 31. The temperature sensitivity of the R-FBG 32 and S-FBG 31 are 12.2 and 11.8 pm/° C., respectively.

Figure 3:
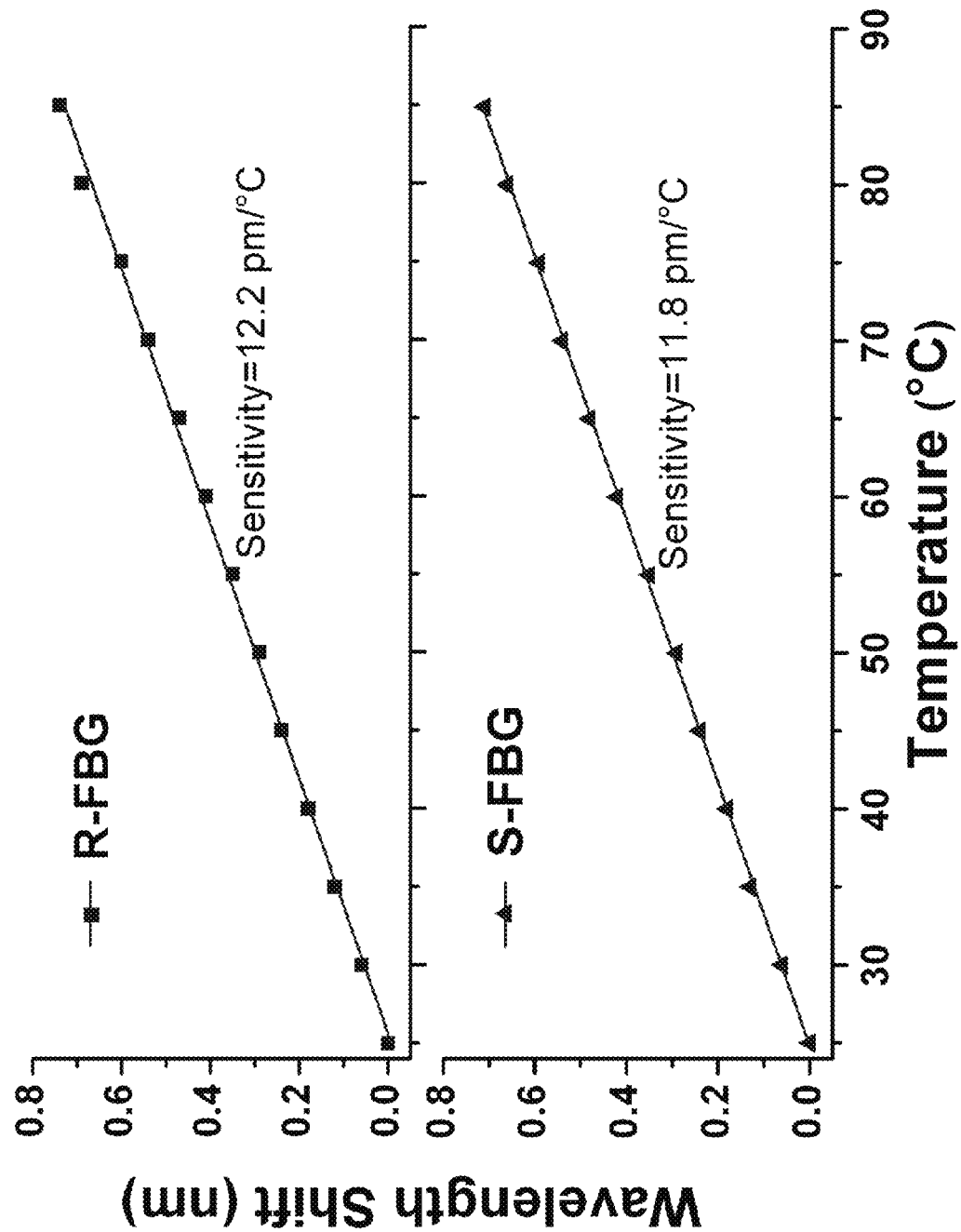
FIG. 3 is a chart depicting temperature dependences of the central wavelengths of the R-FBG and S-FBG of FIG. 1.

Referring to FIG. 3, the wavelength shift of the FBGs 31, 32 with respect to temperature is depicted. In practical applications, the temperature cross-sensitivity of the sensor 10 is taken into account when measuring wind speed. Generally, the variation of air temperature is quite slow and therefore the pump laser 20 is switched off to allow the S-FBG 31 to cool down before using it to measure the air temperature. Alternatively, another fabricated FBG is used in the standard single-mode optical fiber (SMF) and connected to the S-FBG 31 for temperature measurements, which is a common approach used in HWA.

Figure 4:
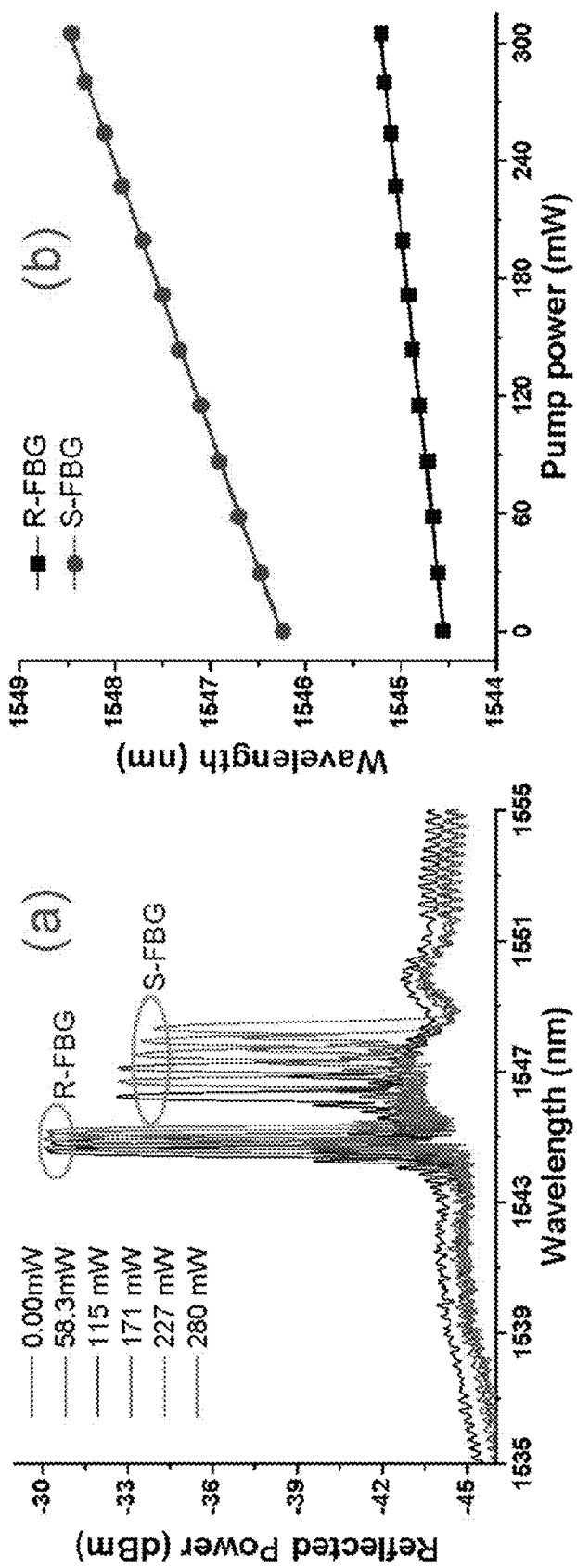
FIG. 4(a) is a chart depicting reflection spectra of the laser-heated FBGs (LHFBGs) with increasing power of the 1480 nm pump laser.
FIG. 4(b) is a chart depicting central wavelengths of the LHFBGs with increasing power of the 1480 nm pump laser.

Referring to FIGS. 4(*a*) and (*b*), the spectra of the two LHFBGs heated by light from a 1480 nm semiconductor laser is depicted. FIG. 4(*a*) presents the dependence of the reflection spectra of the two LHFBGs on the power of the pump laser 20. Both reflection peaks of the two FBGs shift to a longer wavelength with increasing pumping power. The S-FBG 31 exhibits a larger wavelength shift because of its higher absorption coefficient and therefore is heated more efficiently than the R-FBG. FIG. 4(*b*) shows the dependence of the central wavelength of the two LHFBGs on pump power. When the power of pump laser 20 increases from 0 mW to 305 mW, the central wavelength of S-FBG 31 linearly shifts from 1546.24 nm to 1548.46 nm, while the central wavelength of R-FBG 32 only shifts from 1544.56 nm to 1545.21 nm. If the total loss of the two fusion splices and the 7-mm long low light-absorption fiber is about 1 dB is assumed, then the optical power of the pump light 22 reaches S-FBG 31 is about 80% of that reaches the R-FBG 32. Therefore the pumping power consumed in the S-FBG 31 is more than three times of that consumed in the R-FBG 32.

The two LHFBGs form an all-optical fiber anemometer 10. In order to reduce heat transfer, the R-FBG 32 is sealed inside a thin alundum tube with an inner diameter of 0.6 mm and outer diameter of 2-mm. The packaged R-FBG 32 and the unpackaged S-FBG 31 are installed inside a specially designed stainless steel tube which has an inner diameter and outer diameter of 3 mm and 4 mm, respectively. Convection slots are made in the stainless steel tube to allow the S-FBG to be exposed to ambient air. Epoxy adhesive is used to bond the fiber inside the tubes.

Figure 5:
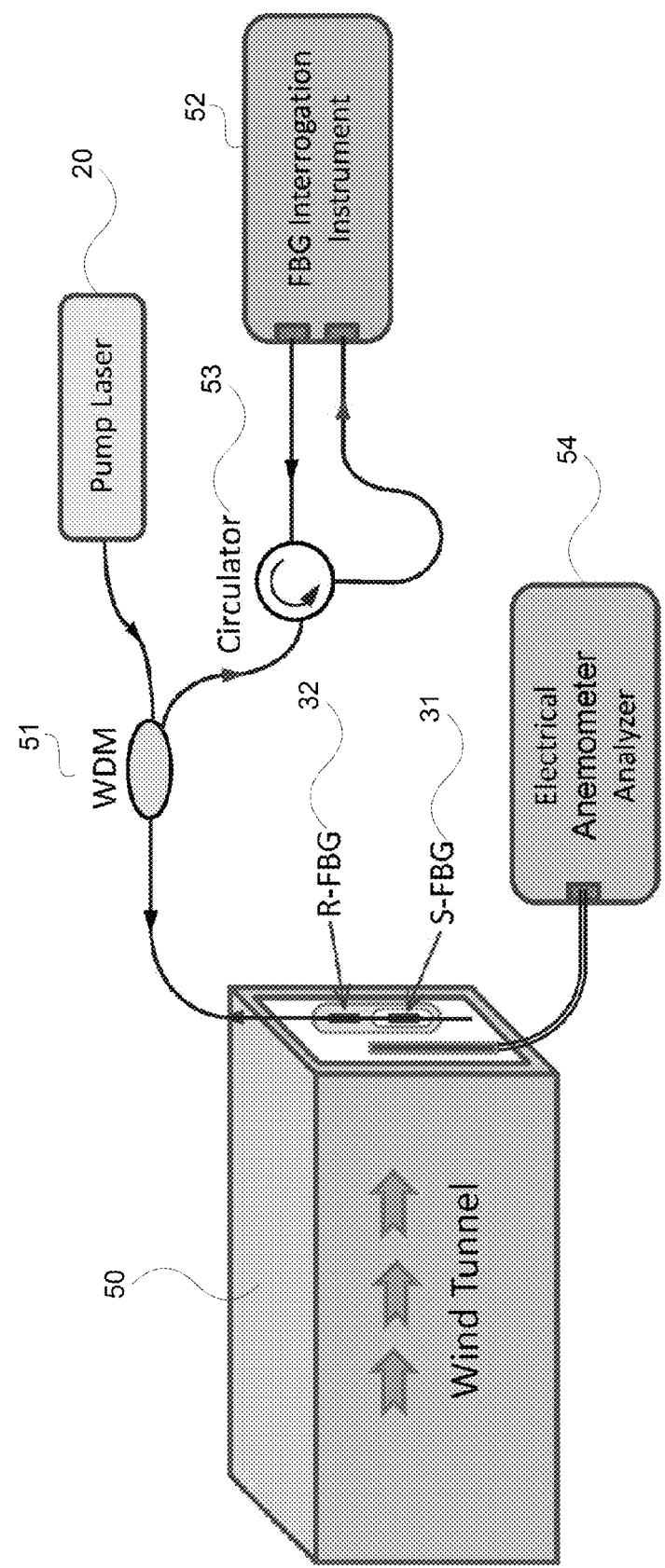
FIG. 5 is a schematic diagram of the setup for test of the LHFBG anemometer.

Referring to FIG. 5, the experimental setup for testing of the FBG-based anemometer 10 is depicted. A commercial wind tunnel 50 (SANLING KQD-03, Scientific & teaching instruments factory of ECNU) and an electrical HWA 54 (DANTEC, Stream Line 90N10 Frame) are used to evaluate the performance of the FBG-based anemometer 10. The wind speed of the wind tunnel 50 can be varied from 0 to 8.0 m/s. The dimensions of the outlet of the wind tunnel 50 are 25.4 cm by 25.4 cm. The FBG-based anemometer 10 and the electrical anemometer 54 are fixed around the outlet of the wind tunnel 50 so that the same wind speed passes over the two anemometers 10, 54. The 1480 nm laser light is launched to the FGB-based anemometer 10 through a 1480/1550 wavelength-division multiplexer (WDM) 51. The probe light 21 is emitted from the FBG interrogator 52 and is also launched to the fiber 11 through an optical circulator 53 and the WDM 51, to interrogate the LHFBGs 31, 32. The resolution and sampling frequency of the FBG interrogator 62 are 1.0 pm and 25 Hz, respectively.

HWA is based on the heat-transfer principle and thus the sensitivity of the sensor 10 depends on the heat transfer rate from the sensor 10 to the surrounding environment. One of the two LHFBG anemometers 10 is recoated with a polymer, for example, epoxy to evaluate the effect of epoxy recoating on the performance of the sensor 10. The diameter of the recoated fiber anemometer is ~0.5 mm. In order to evaluate the effects of pumping power on the sensor performance, the LHFBGs are pumped at three different powers with the 1480 nm laser.

Figure 6:
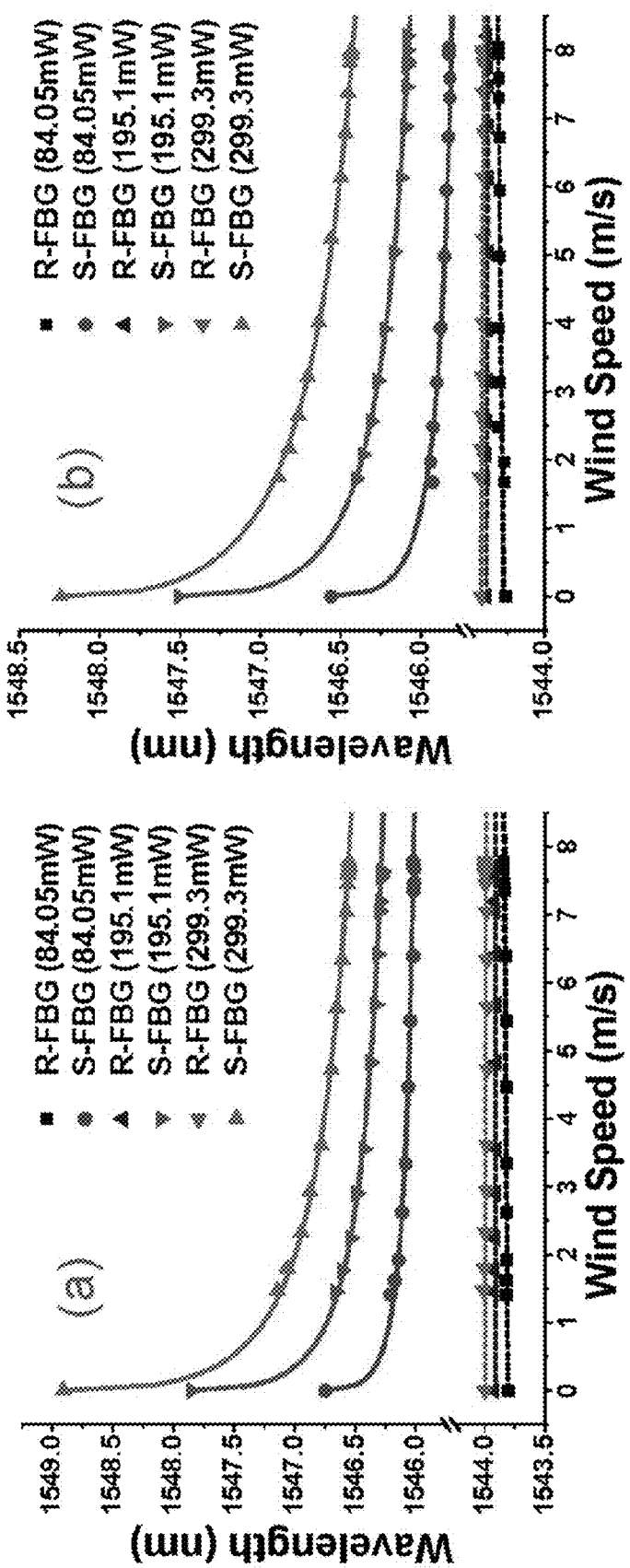
FIG. 6(a) is a chart of measured central wavelengths versus wind speed of the FBG-based anemometer having an S-FBG without coating under different pumping powers where the solid curves are fitted by using a derived equation.
FIG. 6(b) is a chart of measured central wavelengths versus wind speed of the FBG-based anemometer having a recoated S-FBG under different pumping powers where the solid curves are fitted by using a derived equation.

In the experiments, the wind speed in the wind tunnel is manually adjusted. The wind speed and the central wavelengths of the LHFBGs 31, 32 are recorded by using the electrical anemometer 54 and the FBG interrogator 52, respectively. The minimum wind speed that can be set by the wind tunnel is around 1.5 m/s. FIG. 6 shows the measured sensor responses to different wind speeds. When the power of the pump laser 20 is 84.05 mW and there is no wind flow, the central wavelengths of the R-FBG and the S-FBG are 1543.803 nm and 1546.747 nm, respectively. When the wind speed is increased from 0 to 8 m/s, the central wavelength of the S-FBG 31 shifts to a shorter wavelength, while the central wavelength of the R-FBG 32 is almost unchanged. The sensitivity of the LHFBG anemometer 10 is quite high when the wind speed is low, and becomes lower at high wind speed. The sensitivity degradation is similar to that experienced by conventional electrical anemometers as more heat is dissipated at higher wind speed. When the power of the pump laser 20 is increased from 84 mW to 299.3 mW, the anemometer 10 exhibits similar behavior but exhibits higher sensitivity. Therefore, a solution to improve the sensitivity of the LHFBG anemometer 10 at high wind-speed conditions is to increase the pump power.

Based on hot-wire anemometer (HWA) theory, the relationship between the heat loss, $H_{loss}$, and the wind speed, v, is:

$$H_{loss}=[T_a(v)-T_e](A+B\sqrt{v}), \quad (1)$$

where $T_a$ is the temperature of the anemometer, $T_e$ is the temperature of the environment, A and B are empirical calibration constant. Based on the rule of energy conservation, the heat loss $H_{loss}$, should equal to the power consumption of the S-FBG 31, i.e.

$$H_{loss}=P_{input}(1-a_r)a_s, \quad (2)$$

where $P_{input}$ is the input laser power, $a_r$ is the absorption coefficient of the R-FBG 32, and $a_s$ is the absorption coefficient of the S-FBG 31.

The dependence of the wavelength shift of an FBG, $\Delta\lambda$, on the change of temperature, $\Delta T=T_a(v)-T_a(0)$, is known as $$\Delta\lambda/\lambda_{h0}=(\alpha+\xi)\Delta T, \quad (3)$$

where $\lambda_{h0}$ is the wavelength of a heated FBG before wind blowing, and $\alpha$ is the thermal expansion coefficient, and $\xi$ is the thermo-optic coefficient. Using Equations 1 and 3, the dependence of the wavelength shift of the LHFBG anemometer 10 on the wind speed as, $$\Delta\lambda=\lambda_{h0}(\alpha+\xi)[H_{loss}/(A+B\sqrt{v})-\Delta T_0], \quad (4)$$

where $\Delta T_0 = T_a(0)-T_e$. If the wavelength of the FBG before heating is $\lambda_{e0}$, the above equation can be further written as:

$$\lambda(v)-\lambda_{e0}=\lambda_{h0}(\alpha+\xi)H_{loss}/(A+B\sqrt{v}), \quad (5)$$

The solid curves in FIG. 6 show the fitted results using the above equation. The experimental results conform with the theory of hot-wire anemometer. FIG. 6(a) shows measured central wavelengths of the FBGs 31, 32 versus wind speed under different pumping powers without epoxy recoating. FIG. 6(b) shows measured central wavelengths of the FBGs 31, 32 versus wind speed under different pumping powers with epoxy recoating.

Figure 7:
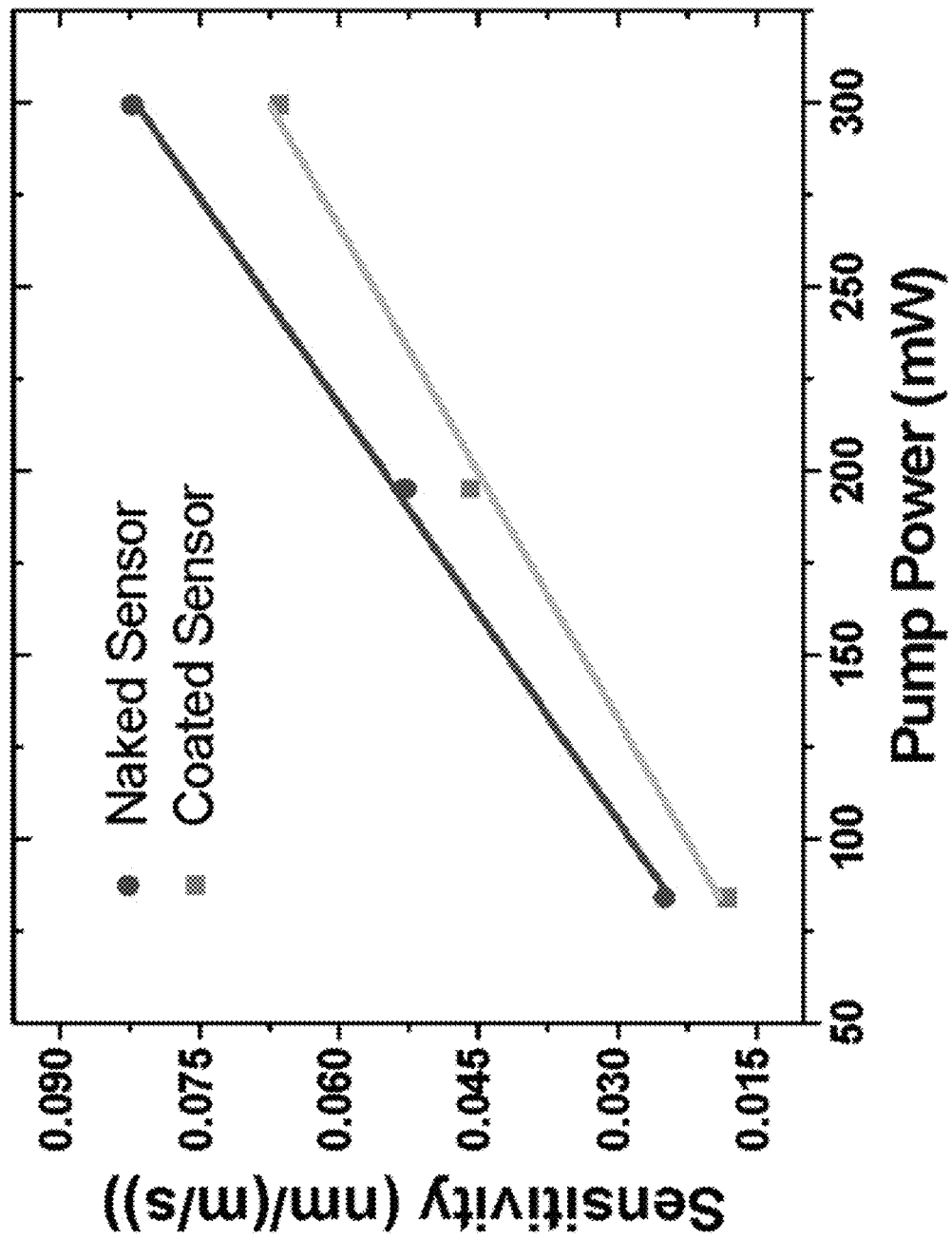
FIG. 7 is a chart depicting effective sensitivities of the recoated and naked anemometers at different pump powers.

Since the anemometers 10 have non-linear responses in the range of wind speed between 2.0 m/s and 8.0 m/s, as shown in FIG. 6, the slopes of linearly fitted data are used as the effective sensitivity in this specific range to evaluate the effects of the pump power and the epoxy recoating on the performance of the sensor 10. FIG. 7 presents the calculated effective sensitivities of the two anemometers 10 with and without epoxy recoating. The sensitivities of the two anemometers 10 increase with pumping power. The recoating process can reduce the sensitivity of the anemometer 10. Based on the calculated sensitivity and the resolution of the FBG interrogator 52, i.e. 1 pm, therefore the resolution of wind speed measurement with the anemometer 10 is ~0.012 m/s for wind speed ranges from 2 m/s to 8 m/s.

Figure 8:
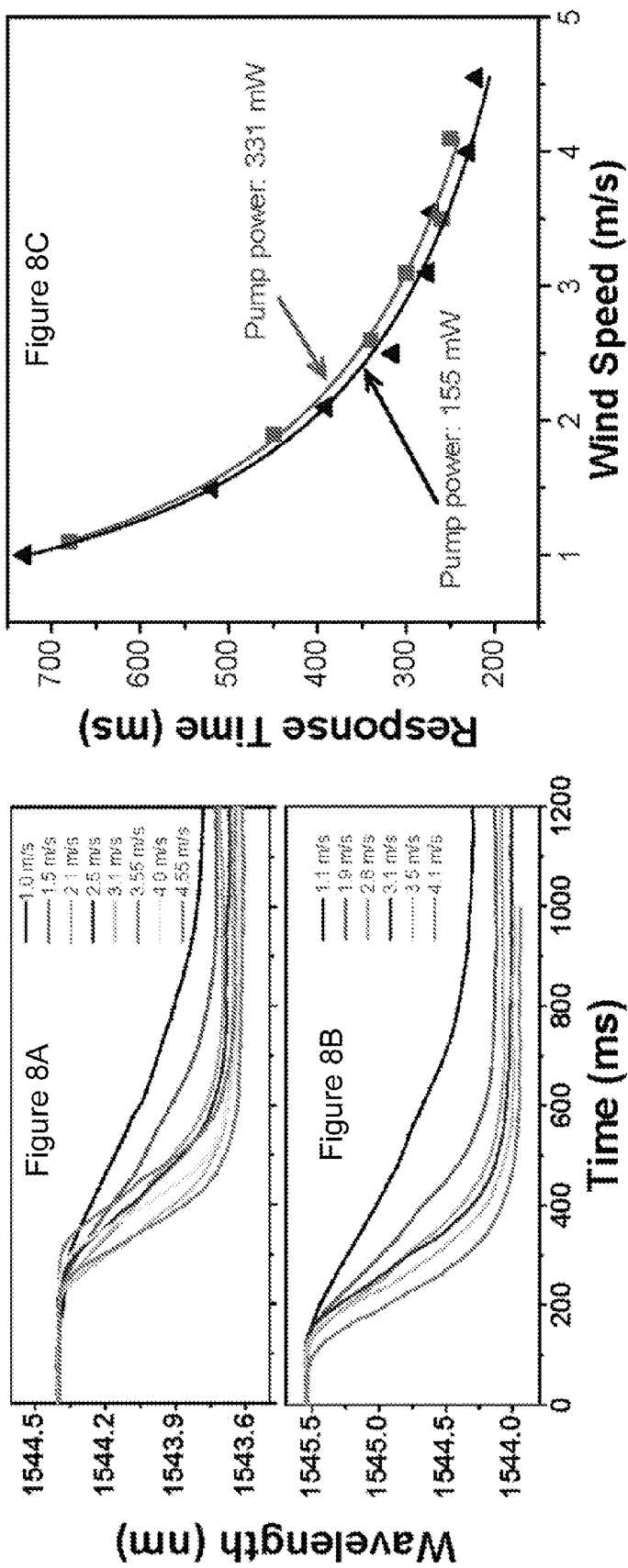
FIG. 8(a) is a chart depicting dynamic responses of the LHFBG anemometer pumped with a pump power of 155 mW.
FIG. 8(b) is a chart depicting dynamic responses of the LHFBG anemometer pumped with a pump power is 331 mW.
FIG. 8(c) is chart response time versus wind speed comparing a pump power of 155 mW and 331 mW.

The dynamic response of the LHFBG anemometer 10 is experimentally evaluated. The anemometer 10 is installed behind a shutter and abruptly blown by air when the shutter is opened. FIGS. 8(a) and 8(b) present two groups of measured dynamic responses of the anemometer 10 pumped at different power levels. The dynamic response of this anemometer 10 depends significantly on the wind speed. The response time decreases from 700 ms to 200 ms when the wind speed rises from 1.0 m/s to 4.5 m/s. By comparison, the dynamic response is not very sensitive to the pump-power level. FIG. 8(c) shows the response time is relatively independent of the pump power when it was increased from 155 mW to 331 mW.

Fabrication and test results of LHFBG based anemometers 10 using FBGs 31, 32 inscribed in light-absorption fibers 11 is provided. Experimental results show that the Cobalt-doped fiber can absorb light efficiently to heat an FBG 31, 32 to become a "hot-wire" without metal coating. Cobalt has the ability to absorb light and convert it into heat and reaches a temperature up to 600° C. if sufficient light is launched into a 10 micron diameter core of the optical fiber. The length of a Cobalt-doped fiber may be 15 mm long. The fabricated LHFBG anemometers 10 are tested inside a commercial wind tunnel 50 and calibrated using a commercial electrical anemometer 54. The performance of the FBG-based anemometer 10 can be predicted accurately using the conventional hot-wires anemometry theory. The effects of pump powers and recoating materials on the sensor sensitivities are investigated for wind speed ranged from 2 m/s to 8 m/s. The single-fiber LHFBG anemometer 10 has great potential for many industrial applications because of the many advantages of optical fiber sensors such as electromagnetic immunity, multiplexing and remote sensing capability.

The pumping scheme uses a length of standard telecommunication SMF fusion jointed to the short length of Cobalt-doped fiber 11. The other end of the standard SMF is connected to a semiconductor laser that is pumping light into the Cobalt-doped fiber 11.

The LHFBG anemometer 10 is able to measure the flow speed of a fluid at high temperature. The sensor 10 can be heated with a laser beam in an optical fiber 11 at a temperature beyond 200° C. and therefore be used to measure gas/liquid flow at high temperature. The LHFBG anemometer 10 is an intrinsic sensor in which the fiber itself is the heat source as well as a temperature sensor. The fiber 11 can be inexpensively mass-produced in lengths of many kilometers long and only a 1 centimeter long section of the fiber is needed to make the optical fiber flow sensor. The sensor is more accurate and more reliable than the prior art because the heat source is also the temperature sensor and thus can measure the temperature of the heat source accurately. Also the LHFBG anemometer 10 avoids post-processing which could mechanically weaken the FBG. No additional parts are needed and therefore it is much simpler and cheaper to manufacture than the prior art.

The LHFBG anemometer 10 may be used for the measurement of gas/liquid flow speed at temperatures up to 110° C. for downhole monitoring. It may also be used to measure the flow speed of superheated steam in a downhole at temperatures beyond 150° C. Conventional flow sensors cannot be used in a downhole due to the high temperature and the depth of downholes of up to 4 km. The LHFBG anemometer 10 may also be used in the biomedical industry in areas such as micro-fluidic and localized heating. The ability to provide non-electrical but controllable and very localized heating up to 100° C. may be used for heat-induced cell death applications. The LHFBG anemometer 10 may be developed to construct a heater a few microns in diameter and less than 1 mm long, which is small enough to place inside a micro channel to heat and measure temperature at the same time.

An optical fiber heater is provided. The heater comprises a light-absorbing optical fiber having a fiber Bragg grating inscribed in the fiber. Light with a predetermined amount of pump power is emitted into the light-absorbing optical fiber to heat the optical fiber and the fiber Bragg grating in order to raise the temperature of the light-absorbing optical fiber to a predetermined temperature of at least 600° C. The predetermined temperature is accurately obtained and monitored by measuring the wavelength shift of the central wavelength of the fiber Bragg grating.

In one embodiment, the optical fiber heater is introduced into a living organism and the predetermined amount of pump power is selected to generate a localised predetermined temperature of at least 600° C. to kill cancer cells proximal to the light-absorbing optical fiber. This causes heat-induced cancer cell death.

Although wind has been described, it is envisaged other fluids may be measured including liquid and gas.

Although specific commercial fibers have been described for introducing optical loss, other fibers may be used that are specifically tailored for light-to-heat conversion. One or more FBGs may be written in a single optical fiber, or a plurality of optical fibers may be used.

It will be appreciated by persons skilled in the art that numerous variations and/or modifications may be made to the invention as shown in the specific embodiments without departing from the scope or spirit of the invention as broadly described. The present embodiments are, therefore, to be considered in all respects illustrative and not restrictive.

We claim:

1. A sensor for measuring flow speed of a fluid, comprising:
    a light-absorbing optical fiber surrounded by a heat insulating material where the light absorbing fiber is heated to a predetermined temperature by light emitted into the light-absorbing optical fiber and loses heat to a fluid passing over the light-absorbing fiber and where the heat insulating material slows the rate of heat loss for extending the range of measurement of the fluid; and
    a fiber Bragg grating inscribed in the light-absorbing optical fiber wherein a central wavelength of the fiber Bragg grating shifts indicating a heat loss by the light-absorbing optical fiber and the fiber Bragg grating to the passing fluid that is indicative of a flow speed of the fluid passing over the light-absorbing optical fiber and the fiber Bragg grating.

2. The sensor according to claim 1, wherein the light is emitted into at least one of a core, a cladding, and an inner cladding of the light-absorbing optical fiber.

3. The sensor according to claim 1, wherein the light-absorbing optical fiber is photosensitive and is co-doped with light absorption materials including any one from the group consisting of: Vanadium, Cobalt, Ytterbium and Neodymium.

4. The sensor according to claim 3, wherein the light-absorbing optical fiber has a long-period grating (LPG), to couple pump light from the core to the light absorption materials.

5. The sensor according to claim 1, wherein central wavelengths of the fiber Bragg grating are recorded by a fiber Bragg grating interrogator.

6. The sensor according to claim 1, wherein pump power of the light emitted into the light-absorbing optical fiber is increased to improve the sensitivity of the sensor if the flow speed of the fluid is high.

7. The sensor according to claim 1, wherein the fiber Bragg grating is housed within a tube, and convection slots are defined in the tube to allow the fiber Bragg grating to be exposed to ambient air.

8. The sensor according to claim 1, wherein the sensor is recoated with a polymer to increase the sensitivity of the sensor at higher flow rate.

9. The sensor according to claim 8, wherein the sensor is fusion joined to a low-loss optical fiber such that the light to heat the optical fiber and an interrogation light to the fiber Bragg grating to determine the shift in the central wavelength of the fiber Bragg grating is delivered to the sensor for at least the length of a kilometer of the low-loss optical fiber.

10. The sensor according to claim 1, wherein the heat insulating material includes at least one of glass and polymers.

11. The sensor according to claim 1, wherein the fiber Bragg grating is sealed in an alundum tube to reduce heat transfer.

12. The sensor according to claim 1, wherein the relationship between the heat loss, $H_{loss}$, and the flow speed of the fluid v is calculated by: $H_{loss}=[T_a(v)-T_e](A+B\sqrt{v})$, where $T_a$ is the temperature of the sensor, $T_e$ is the temperature of the ambient environment, are A and B are empirical calibration constant.

13. The sensor according to claim 12, wherein dependence of a wavelength shift $\Delta\lambda$ of the sensor on the flow speed of the fluid v is calculated by:

$$\lambda(v)-\lambda_{e0}=\lambda_{h0}(\alpha+\xi)H_{loss}/(A+B\sqrt{v}),$$

where $\Delta T_0=T_a(0)-T_e$, $\lambda_{e0}$ is a wavelength of the fiber Bragg grating before heating, $\lambda_{h0}$ is a wavelength of the heated fiber Bragg grating before the fluid passes over the sensor, $\alpha$ is a thermal expansion coefficient, and $\xi$ is a thermo-optic coefficient.

14. The sensor according to claim 1, wherein the light-absorbing optical fiber has a light absorption coefficient in a range from about 1 dB/cm to about 150 dB/cm.

15. The sensor according to claim 1, wherein the light emitted into the light-absorbing optical fiber has a pump power of more than 1 mW.

16. The sensor according to claim 1, wherein the light-absorbing optical fiber is a double-clad (DC) fiber, and the core of the optical fiber is surrounded by one of an inner cladding and an inner cladding and an outer cladding.

17. The sensor according to claim 1, wherein the light-absorbing optical fiber has a light absorption coefficient of a predetermined amount such that light-to-heat conversion occurs within a short section of the optical fiber.

18. A system for measuring flow speed of a fluid, comprising a plurality of sensors as defined in claim 1 that are multiplexed together.

19. The system according to claim 18, wherein each of the plurality of sensors include short sections of the light-absorbing optical fibers with fiber Bragg gratings inscribed in each of the light-absorbing optical fibers and the sensors are connected in a single line by fusion joining the sensors with sections of low-loss optical fibers such that a predetermined amount of light reaches a last sensor located at the distal end of the single line.

20. The system according to claim 19, further comprising an optical splitter to deliver the light to each sensor along a plurality of different optical fibers.

21. A method for measuring flow speed of a fluid, comprising:
    emitting a light into a light-absorbing optical fiber to heat the light-absorbing optical fiber and a fiber Bragg grating inscribed in the light-absorbing optical fiber to measure temperature;
    slowing the heat loss of the light absorbing optical fiber to extend the range of measurement of the fluid;
    monitoring the wavelength shift of the central wavelength of the fiber Bragg grating when the fluid passes over the optical fiber;
    determining the rate of heat loss of the fiber Bragg grating using the monitored wavelength shift; and
    determining a flow speed of the fluid passing over the light-absorbing optical fiber based upon the rate of heat loss of the fiber Bragg grating.

22. The method according to claim 21, wherein pump power of the light is increased when the flow speed of the fluid is high.

23. An optical fiber heater, comprising:
a light-absorbing optical fiber having a fiber Bragg grating inscribed in the fiber that is heated to a temperature of at least 600° C. by light emitted into the light-absorbing optical fiber at a predetermined amount of pump power and the predetermined temperature is monitored by measuring a wavelength shift of a central wavelength of the fiber Bragg grating.

24. The optical fiber heater of claim 23, wherein the optical fiber heater is introduced into a living organism and the predetermined amount of pump power is selected to generate a localised predetermined temperature to kill cancer cells proximal to the light-absorbing optical fiber causing heat-induced cancer cell death.

* * * * *